United States Patent
Rozenberg et al.

(10) Patent No.: US 9,230,128 B2
(45) Date of Patent: Jan. 5, 2016

(54) ASSIGNMENT OF SECURITY CONTEXTS TO DEFINE ACCESS PERMISSIONS FOR FILE SYSTEM OBJECTS

(71) Applicant: Protegrity Corporation, George Town, Grand Cayman (KY)

(72) Inventors: Yigal Rozenberg, Wilton, CT (US); Ulf Mattsson, Cos Cob, CT (US); Raul Ortega, Westport, CT (US)

(73) Assignee: Protegrity Corporation, Grand Cayman (KY)

( * ) Notice: Subject to any disclaimer, the term of this patent is extended or adjusted under 35 U.S.C. 154(b) by 0 days.

(21) Appl. No.: 14/203,390

(22) Filed: Mar. 10, 2014

(65) Prior Publication Data
US 2014/0283131 A1 Sep. 18, 2014

Related U.S. Application Data

(60) Provisional application No. 61/780,632, filed on Mar. 13, 2013.

(51) Int. Cl.
*G06F 21/62* (2013.01)
*G06F 21/52* (2013.01)
*G06F 21/55* (2013.01)

(52) U.S. Cl.
CPC ............ *G06F 21/6209* (2013.01); *G06F 21/52* (2013.01); *G06F 21/554* (2013.01); *G06F 21/556* (2013.01); *G06F 21/6281* (2013.01)

(58) Field of Classification Search
CPC ..... G06F 21/6209; G06F 21/52; G06F 21/53; G06F 21/54; G06F 21/566; G06F 21/554; G06F 2221/034; G06F 2221/2113; G06F 2221/2141; G06F 2221/2149; G06F 21/6281
USPC .......................................................... 726/28
See application file for complete search history.

(56) References Cited

U.S. PATENT DOCUMENTS

| | | | |
|---|---|---|---|
| 7,177,839 B1 * | 2/2007 | Claxton et al. .................. 705/44 |
| 7,249,379 B2 * | 7/2007 | Larsen ............................ 726/22 |
| 2002/0095592 A1 * | 7/2002 | Daniell et al. ................. 713/200 |
| 2005/0039034 A1 * | 2/2005 | Doyle et al. ................... 713/193 |
| 2006/0059567 A1 * | 3/2006 | Bird et al. ....................... 726/27 |
| 2009/0050695 A1 * | 2/2009 | Ma et al. ....................... 235/382 |
| 2009/0063951 A1 * | 3/2009 | Rjaibi et al. ................... 715/234 |
| 2009/0198697 A1 * | 8/2009 | Bilger et al. ...................... 707/9 |
| 2010/0176916 A1 * | 7/2010 | Baucom ......................... 340/5.5 |
| 2010/0180339 A1 * | 7/2010 | Finlayson et al. .............. 726/21 |
| 2010/0223221 A1 * | 9/2010 | Gardner et al. ................. 706/45 |
| 2011/0238978 A1 * | 9/2011 | Majumdar et al. ............ 713/152 |
| 2011/0277017 A1 * | 11/2011 | Ivanov et al. ..................... 726/4 |

* cited by examiner

*Primary Examiner* — Chau Le
*Assistant Examiner* — Don Zhao
(74) *Attorney, Agent, or Firm* — Fenwick & West LLP

(57) ABSTRACT

A system and method are provided for restricting various operations in a file system based on security contexts. An object security context including permissible roles and defining a set of access permissions associated with each of the permissible roles is assigned to a file system object. A user security context is assigned to a user based on authentication information from the user, and the user security context identifies a user role for the user. An executable security context is assigned to an executable program. When the user has launched the executable program, a process is created and assigned the user security context and the executable security context. Responsive to the process attempting to access the file system object, at least one of the user security context and executable security context is verified against the object security context to determine if the attempted access should be allowed.

20 Claims, 3 Drawing Sheets

ASSIGNMENT OF SECURITY CONTEXTS TO DEFINE ACCESS PERMISSIONS FOR FILE SYSTEM OBJECTS

CROSS-REFERENCE TO RELATED APPLICATION(S)

This application claims priority under 35 U.S.C. §119(e) to U.S. Provisional Patent Application Ser. No. 61/780,632, "Assignment of Security Contexts to Define Access Permissions for File System Objects," filed Mar. 13, 2013, the contents of which is incorporated herein by reference in its entirety.

TECHNICAL FIELD

This disclosure relates to security in a computing system, and in particular to assigning security contexts and restricting access operations based on the security contexts.

BACKGROUND OF THE INVENTION

In computing systems, security has become more and more important. Most organizations or companies operate upon computing systems such as file systems. However, unauthorized users can attempt illegal operations or accesses to the systems. For example, in a company, certain confidential files cannot be viewed or edited by all employees. The company needs a security mechanism to restrict access to the certain files to only authorized employees (e.g., employees with a manager position or higher). In addition, the company can also need to restrict allowable file operations based on the user requested the operation. For example, a manager can be limited to "view" operations, whereas a vice-president can perform edit operations.

In some situations, restriction to programs utilized by users to access files is needed as well. For example, organizations or companies can prevent users from using an untrusted program to perform operations on certain important files. Therefore, a mechanism for preventing untrusted programs from operating on certain files is also needed.

SUMMARY OF THE INVENTION

To provide security in file systems, security contexts are assigned to users, executable programs, and file system objects so that different access permissions can be defined for different combinations of users, executable programs, and file system objects. In this way, a multi-layer level of security is enabled when the users attempt to use the executable programs to access the file system objects.

In one embodiment, an object security context is assigned to a file system object. The object security context includes permissible roles and defines a set of access permissions associated with each of the permissible roles. A permissible role can be a user role or an executable role. A user security context is assigned to a user based on authentication information from the user, and the user security context identifies a user role for the user. An executable security context is assigned to an executable program. The executable security context identifies an executable role for the executable program. The executable security context can be selected based on the user role. For example, the executable role can be the same as the user role. In other examples, the executable role is related to but different from the user role. Thus, the object security context includes one or more permissible roles that can be matched against roles defined in user security context and executable security context associated with different users and executable programs.

When the user has launched the executable program, a process is created and associated with the user security context and the executable security context. Responsive to the process attempting to access the file system object, at least one of the user security context and executable security context is verified against the object security context of the file system object to determine if the attempted access should be allowed.

Further, in one embodiment, the object security context is checked to determine whether it includes at least one permissible role that matches either the user role or the executable role. If the object security context includes a permissible role that matches either the user role and the executable role, it is further checked to determine whether the set of access permissions associated with the permissible role includes a permission for the access operation. Responsive to the set of access permissions associated with the permissible role including a permission for the access operation, the access operation is determined to be allowable.

In another embodiment, the object security context is checked to determine whether the object security context includes permissible roles that match both the user role and the executable role. Responsive to the object security context including permissible roles that match both the user role and the executable role, the object security context is further checked to determine whether the set of access permissions associated with each of the permissible roles includes permission for the access operation. If the set of access permissions associated with each of the object roles include permission for the access operation, the access operation is determined to be allowable.

In other embodiments, the object security context further specifies different access log settings for different permissible roles.

BRIEF DESCRIPTION OF THE DRAWINGS

The teachings of the present invention can be readily understood by considering the following detailed description in conjunction with the accompanying drawings. Like reference numerals are used for like elements in the accompanying drawings.

The figures depict embodiments of the present invention for purposes of illustration only. One skilled in the art will readily recognize from the following discussion that alternative embodiments of the structures and methods illustrated herein can be employed without departing from the principles of the invention described herein.

DETAILED DESCRIPTION

An embodiment of a system for assigning security contexts and restricting an access operation based on the security contexts is now described with reference to the figures where like reference numbers indicate identical or functionally similar elements.

System Overview

Figure 1:
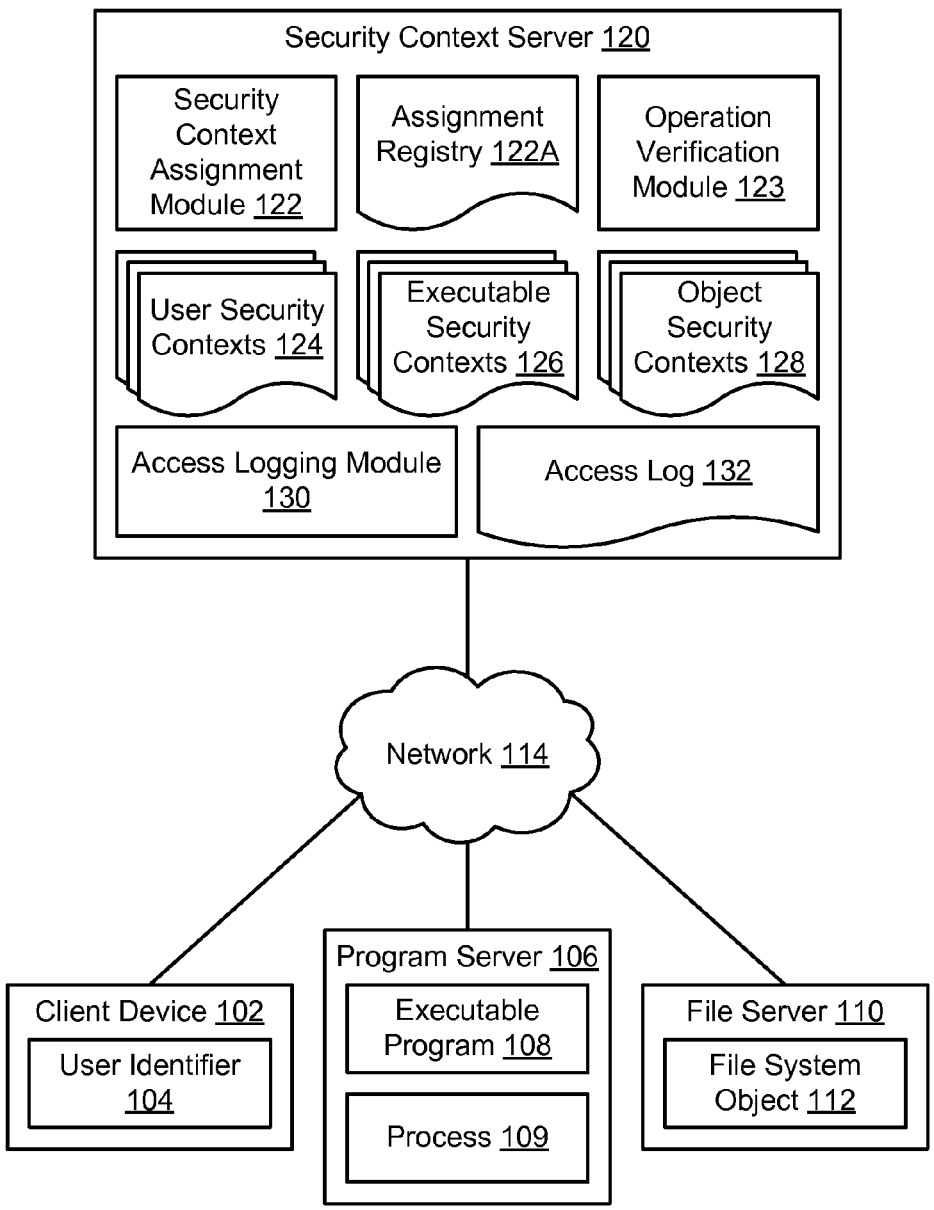
FIG. 1 is a block diagram illustrating a system for assigning security contexts and restricting operations based on the security contexts, according to one embodiment of the present invention.

FIG. 1 is a block diagram illustrating a system 100 for assigning security contexts and restricting operations based on the security contexts, according to one embodiment. The system 100 includes a client device 102, a program server 106, a file server 110, and a security context sever 120. The entities 102, 106, 110 and 120 are coupled to each other via a network 114. For example, the network 114 is a local area network or the internet. In other embodiments, the system 100 includes different, fewer, or additional components than those illustrated in the embodiment of FIG. 1.

The client device 102 can be any suitable computing device that has communication capabilities, such as a computer, a desktop computer, a laptop computer, a tablet device, a netbook, an internet kiosk, a personal digital assistant, a mobile phone, or a gaming device. The client device 102 can include an application such as a web browser that enables a user to interact with the client device 102. The user can interact with the client device 102 to communicate with the other entities 106, 110, and 120 via the network 114.

In the illustrated embodiment, the client device 102 includes a user identifier 104 identifying the user of the client device 102. In one embodiment, the user launches an executable program 108 stored on the program server 106 and the program server 106 creates a new process 109 by loading the executable program 108 into memory (e.g., RAM) for execution by a processor (not pictured). For example, the executable program 108 can be a file manager application that performs common file system operations like copying, renaming, and deleting file system objects. The new process 109 is associated with the user 104 and the executable program 108. After the process 109 is created, the user 104 interacts with the process 109 to perform an operation on a file system object 112 (e.g., a file or a folder) on the file server 110. For example, the user 104 can launch a spreadsheet program and interact with the resulting process to read or modify a spreadsheet file.

The security context sever 120 intercepts the operation before it is performed and determines whether the operation should be allowed. If the security context server 120 determines that the operation should be allowed, the security context server 120 communicates with the program server 106 to allow the process 109 to perform the operation. In one embodiment, the security context server 120 checks the security context assigned to the file system object 112 against security contexts assigned to the process 109 to determine if the process 109 is allowed to perform the operation of accessing the file system object 112.

A security context assigned to a file system object 112 (also referred to as "an object security context") is a set of rules for a user 104 or an executable program 108 that must be satisfied before accessing the file system object 112. For example, an object security context contains a list of one or more permissible roles and corresponding access permissions granted to users 104 or executable programs 108 associated with each of the one or more permissible roles. The access permissions corresponding to a given permissible role can allow users 104 or executable programs 108 associated with the permissible role to perform certain operations, but can prevent other operations from being performed. For example, users 104 and executable programs 108 associated with the "Accountant" role can perform read operations, but not create, update, and delete operations. Examples for operations of accessing the file system object 112 can include, but are not limited to, read operations, write operations, create operations, delete operations, update operations, import operations, export operations, save operations, print operations, and the like. One skilled in related art will recognize that other examples for operations on file system objects 112 are possible. The access permissions corresponding to permissible roles can allow any one or more of the operations, and prevent others, based on different security levels associated with the corresponding permissible roles.

In addition, an object security context can also specify other access criteria that must be satisfied by a user 104 or an executable program 108 before accessing the file system object 112. For example, an object security context specifies a set of dates and times when the file system object 112 is accessible. Therefore, if a user 104 or executable program 108 attempts to access the file system object 112 at a different date and time than that specified by the object security context, the access is denied. In another example, an object security context indicates a list of identifications of client devices 102 (e.g., identifications of personal computers, laptops, personal digital assistants, tablets, smart phones, etc.) that can be used to access the file system object 112. In yet another example, an object security context specifies that the executable program 108 must be authenticated by a trusted third party in order to access the corresponding file system object 112. One skilled in related art will appreciate that other criteria or rules are possible. In other embodiments, the object security context can define access or other permissions based on any combination of the rules or criteria. It should be noted that although the access operation is commonly referenced herein, the security contexts and permissions described herein apply equally to other operations.

Security contexts can also be assigned to a user 104 (also referred to as "a user security context") and an executable program 108 (also referred to as "an executable program security context"). In one embodiment, a user security context defines certain rules or criteria that must be satisfied by an associated user 104. Similarly, an executable security context of an executable program 108 includes certain rules or criteria that must be satisfied by the executable program 108. For example, a user security context or executable program security context defines a user role or an executable role for the corresponding user 104 or executable program 108, respectively. As used herein, a user 104 is associated with a particular user role if the user 104 has been assigned a user security context 124 associated with the user role. Similarly, an executable program 108 is associated with a particular executable role if the executable program 108 has been assigned an executable security context 126 associated with the executable role.

Security contexts are assigned to users 104, executable programs 108, and file system objects 112 so that different access permissions can be defined for different combinations of users and executable programs 108 that attempt to access a file system object 112. A process 109 inherits any roles associated with an associated user 104 and executable program 108. For example, when a user 104 launches an executable program 108, a new process 109 is created and the process 109 is associated with the user 104 and assigned the user security context associated with the user and executable security context associated with the executable program. When the process 109 attempts to access a file system object 112, the security context server 120 intercepts the access operation and checks the access permissions for the roles inherited by the process 109 to determine whether the access should be allowed. The security context server 120 allows the access to the file system object 112 if the access permissions indicate that the attempted access operation is granted to some or all of the roles assigned to the process 109. In some embodiments, the access permissions defined by both the user roles inherited by the process 109 and the executable roles inherited by the process must be satisfied before the file system object 112 can be accessed. Such a configuration prevents an unauthorized user from accessing the object 112 by using a permissible executable, and prevents an authorized user from accessing the object 112 using an impermissible executable.

In some embodiments, the executable security context specifies launch permissions for a certain user role to launch the executable program 108. For example, the executable security context can identify the "Sales Clerk" role for the executable program 108, allowing only users associated with the Sales Clerk role to use the executable program 108.

In some embodiments, the user security context specifies access permissions associated with a user role. For example, the user security context can define a "Secretary" role for the user 104, and can define corresponding access permissions associated with the Secretary role. The access permissions for the Secretary role can indicate certain dates and times when the user 104 associated with the Secretary role can perform certain operations on certain file system objects 112 using certain executable programs 108. For example, the access permissions indicate that the Secretary role is allowed to read and copy files in a Client folder on Fridays at 1-5 PM using a file management program.

Although the system 100 of FIG. 1 illustrates the client device 102, the program server 106, the file server 110, and the security context server 120 as separate entities, the functionality of any of these entities 102, 106, 110, and 120 can be combined into a single entity. Furthermore, although only a single file system object 112 is shown in FIG. 1, the system 100 can include any number of file system objects 112, either within the file server 110, separate file servers 110, or any other entity of the system 100. Similarly, the system 100 can include additional executable programs 108 and processes 109, and any number of user (associated with any number of user identifiers 104) can be access and use the system 100.

In the illustrated embodiment, the security context server 120 includes a security context assignment module 122, an assignment registry 122A, an operation verification module 123, user security contexts 124, executable security contexts 126, object security contexts 128, an access logging module 130, and an access log 132. In other embodiments, the security context server 120 can include different, fewer, or additional modules configured to perform the functions described herein.

The security context assignment module 122 assigns security contexts 124, 126, and 128 to users 104, executable programs 108, and file system objects 112, respectively. In one embodiment, the security context assignment module 122 maintains the assignment registry 122A that associates user identifiers 104, executable programs 108, and file system objects 112 with their respective security contexts 124, 126, and 128. Hence, the security context assignment module 122 assigns a security context 124, 126, or 128 by creating a new entry in the assignment registry 122A identifying a security context 124, 126, or 128 and the user 104, executable program 108, or file system object 112 to which the security context 124, 126, or 128 is being assigned. The new entry can also indicate a type (e.g., a user type, an executable program type, or a file system object type), associated roles, and associated access permissions. For example, the security context assignment module 122 creates and stores a new entry in the assignment registry 122A identifying a file system object, indicating that it has a file system object type and including its associated permissible roles and corresponding access permissions. Similarly, when a user 104 launches an executable program 108, the security context assignment module 122 creates new entries in the assignment registry 122A to indicate that the new process 109 associated with the executable program 108 is also associated with the user and executable security contexts 124 and 126 that were assigned to the user 104 and executable program 108. A registry entry can also include additional details related to the assignment of the security context 124, 126, or 128, such as the time the assignment was made. The security context assignment module 122 can also remove a security context assignment by deleting the corresponding registry entry.

When a process 109 attempts to perform an access operation on a file system object 112, the operation verification module 123 intercepts the attempted access operation before access is allowed. After intercepting the attempted access operation, the operation verification module 123 determines whether the access operation should be allowed by verifying the user and executable security contexts 124 and 126 assigned to the process 109 against the object security context 128 of the file system object 112. In some embodiments, the operation verification module 123 determines whether the object security context 128 includes at least one permissible role that matches at least one of a user role (defined in the user security context 124) and an executable role (defined in the executable security context 126). If there is such a match, the operation verification module 123 further determines whether the access permissions associated with the matched permissible role includes a permission for the attempted access operation. If so, the operation verification module 123 allows the attempted access operation. Otherwise, the operation verification module 123 denies it.

In other embodiments, the operation verification module 123 determines whether the object security context 128 includes permissible roles matching both the user role and the executable role. If one or more permissible roles match both user and executable roles, the operation verification module 123 determines whether the access permissions associated with each of the matched permissible roles include a permission for the attempted access operation. If so, the operation verification module 123 allows the attempted access operation. Otherwise, the operation verification module 123 denies it. Functionality of the operation verification module 123 is described in more detail below with reference to FIGS. 2 and 3.

In one embodiment, a user security context 124 includes a role identifier that identifies a user role for the user 104 to which the user security context 124 is assigned. As used herein, a user role is a label or value that identifies or maps to a title, position, or qualification of a user 104. The user role typically represents a title or position associated with a person in a real-life organization or company. For example, a user security context 124 can include an identifier indicating that the assigned user 104 has a role of Accountant, Customer Service Representative, Secretary, Manager, or the like. Alternatively, a user role can be specified by values, such as "1" for Accountant, "2" for Customer Service Representative," and so forth. As used herein, a user 104 is associated with a particular user role, if the user 104 has been assigned a user security context 124 with the user role. For example, a user 104 is associated with an Accountant role if the user 104 has been assigned a security context 124 specifying an Accountant role.

Similarly, each executable program security context 126 includes a role identifier that identifies an executable role for the executable program 108 to which the security context 126 is assigned, and an executable program 108 is associated with a particular executable role if the executable program 108 has been assigned an executable security context 126 with the executable role. In one embodiment, an executable role associated with an executable program 108 is representative of the user role associated with the user 104 running the executable program 108. For example, the security context assignment module 122 can assign an executable security context 126 to an executable program 108 based on the user role associated with the user 104 running the executable program 108.

In some embodiments, the same roles are used for the executable programs 108 and the users 104. For example, if a user 104 associated with an Accountant role is running an executable program 108, then the executable program 108 is assigned a security context 126 with the Accountant role. In this embodiment, the user security contexts 124 and the executable program security contexts 126 can be merged into a single set of security contexts that can each be assigned to users 104 or executable programs 108. For example, the same security context identifying the Accountant role is assigned to the user 104 and an executable program 108 used by the user. Alternatively, the security context server 120 can maintain a separate set of user security contexts 124 and executable program security contexts 126 so that a user security context 124 containing a particular role identifier can include additional information that is not included in the executable program security context 126 with the same role identifier, and vice versa. For example, the user security context 124 associated with the Accountant role identifier can contain different access log settings (as described below with reference to the access logging module 130) than the executable program security context 126 associated with the Accountant role identifier.

In one embodiment, the executable program 108 is associated with an executable role that corresponds to multiple user roles. For example, an executable program 108 is assigned an executable security context 126 with a Management role if the user 104 running the executable program 108 is associated with the user role of Secretary or Manager. This can be useful, for example, if an administrator wishes to grant the same access permissions to users 104 associated with both roles but wishes to maintain different access log settings for the two roles.

In other embodiments, the executable role associated with an executable program 108 is different from the user role associated with the user 104 even if the user 104 is running the executable program 108. For example, the security context assignment module 122 can assign to an executable program 108 an executable security context 126 with a Secretary role, while assigning a Manager role defined in the user security context 124 to the user 104 who is running the executable program 108. If the object security context 128 for a file system object 112 grants permissions to a Manger role, but not to a Secretary role, then the user 104 cannot use the executable program 108 to access the file system object 112. In this way, the system 100 can prevent a user 104 from using an executable program 108 to access a file system object 112 if the executable program 108 has not been assigned an appropriate executable security context 126, even though the user 104 is associated with an appropriate role that is granted access permissions to the file system object 112.

As described above, in one embodiment, an object security context 128 includes a plurality of permissible roles and a set of access permissions associated with each of the plurality of permissible roles. The permissible roles in an object security context 128 match the roles in the user security contexts 124 and the executable program security contexts 126. The set of access permissions associated with a permissible role includes fields for a plurality of access operations, and the access permissions specify whether a user 104 or executable program 108 that is associated with the associated permissible role is able to perform each operation. In one embodiment, each set of access permissions includes fields for operations including creating, reading, updating, and deleting the assigned file system object 112. In other embodiments, each set of access permissions includes fields for additional, fewer, or different operations. For example, other operations can include executing the assigned file system object 112 (e.g., when the assigned file system object 112 is executable such as a software application), changing permissions of the assigned file system object 112, or taking ownership of the assigned file system object 112.

An object security context 128 can be assigned to a single file system object 112 or to a plurality of file system objects 112. Similarly, a user security context 124 can be assigned to a single user 104 or to a plurality of users 104, and an executable program security context 126 can be assigned to a single executable program 108 or to multiple executable programs 108. For example, if the system 100 is used to enforce file security in a store, a first user security context 124 defining a Sales Clerk role can be assigned to a plurality of sales clerks, while a second user security context 124 defining a Manager role can be assigned to a single manager for the store. Similarly, an object security context 128 defining a set of access permissions for the Sales Clerk role (e.g., read and update only) and a separate set of access permissions for the Manager role (e.g., create, read, update, and delete) can be assigned to a plurality of spreadsheet files that are used to manage different categories of products in the store's inventory. Thus, users 104 assigned the Sales Clerk role can only read and update existing spreadsheets while the user 104 assigned the Manager role can also create new spreadsheets and delete existing spreadsheets. Further, an executable security context 126 defining both a Sales Clerk role and Manager role can be assigned to an executable program 108 (e.g., a trusted spreadsheet program). This way, the users 104 assigned the Sales Clerk role and the users 104 assigned the Manager role can perform corresponding operations defined by the access permissions using the trusted spreadsheet program, but not other programs without an appropriate executable security context 126. For example, the users 104 associated with the Sales Clerk role can read and update existing spreadsheets using only the trusted spreadsheet program. Similarly, the user 104 associated with the Manager role can read, update and delete existing spreadsheets, and create new spreadsheets using only the trusted spreadsheet program.

In one embodiment, an object security context 128 can also specify whether to maintain a log of access operations for the assigned file system object 112. If an object security context 128 specifies that a log should be maintained, then the access logging module 130 creates new entries in the access log 132 when a user 104 interacts with the assigned file system object 112. Log entries can include one or more of: an identifier for the user 104 and the assigned user security context 124, an identifier for the executable program 108 and the assigned executable program security context 126, a timestamp of the access operation, and whether or not the access operation was allowed. In other embodiments, a log entry can include additional, less, or different information. In some embodiments, the access logging module 130 is configured to only create a log entry when an access operation is allowed. Alternatively, the access logging module 130 can be configured to only create a log entry when an access operation is denied, or when a different condition or set of conditions is met.

In one embodiment, an object security context 128 can specify different access log settings for different permissible roles. Continuing with the previous example of sales clerks and managers, the object security context 128 can specify that access operations attempted by users 104 assigned the Sales Clerk role should be logged but access operations attempted by users 104 assigned the Manager role should not be logged. Alternatively, an object security context 128 can specify the same access log settings for every permissible role. In one embodiment, access log settings can also be specified in a user security context 124 or an executable program security context 126. For example, a user security context 126 can include action log settings specifying that all access operations attempted by the assigned user 104 should be logged, regardless of whether the action log settings for the object security context 128 indicates that the operation should be logged. This can be useful, for example, if an administrator wishes to maintain a record of all access operations attempted by a suspicious user.

In some embodiments, the assignment registry 122A maintained by the security context assignment module 122 and the content of the security contexts 124, 126, or 128 are write-protected to prevent users 104 and executable programs 108 from making unauthorized modifications. For example, the security context server 120 can require entry of an administrator's authentication information before allowing a user 104 or executable program 108 to make modifications to the assignment registry 122A or the security contexts 124, 126, or 128.

System Operation

Figure 2:
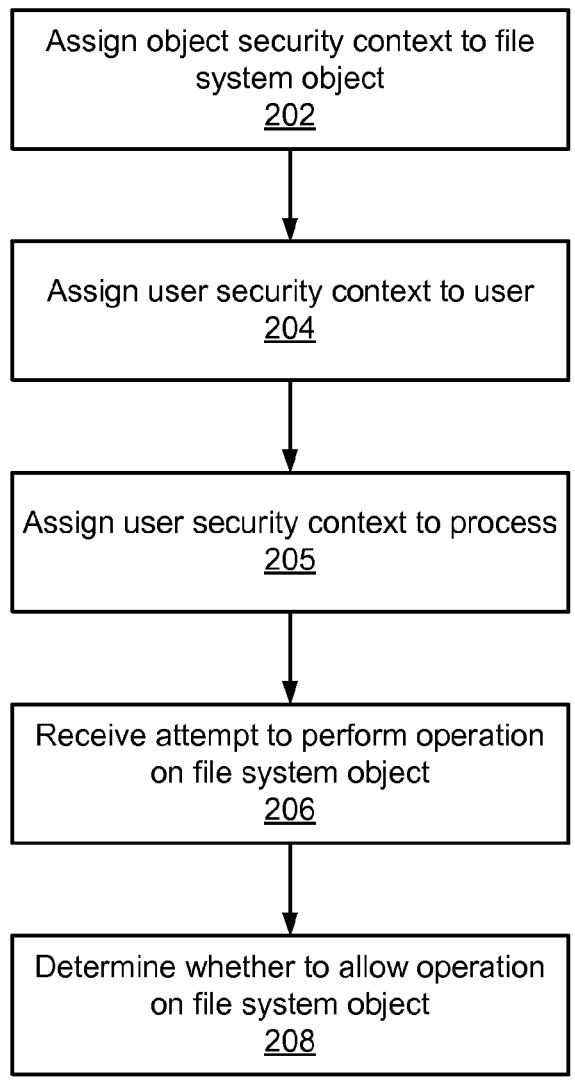
FIG. 2 is a flowchart illustrating a method for using security contexts to determine whether to allow a user to perform an access operation on a file system object, according to one embodiment.

FIG. 2 is a flowchart illustrating a method 200 for using security contexts to determine whether to allow a user to perform an access operation on a file system object, according to one embodiment. The security context assignment module assigns 202 an object security context to the file system object and assigns 204 a user security context to the user. After the user launches an executable program, the security context assignment module also assigns 205 the user security context to the process that is created. As described above, the user and object security contexts can be assigned by creating an entry in the assignment registry. The user interacts with the process to perform an access operation on the file system object, and the operation verification module intercepts 206 the attempt to perform the access operation. In this illustrated embodiment, the executable program does not have an executable security context assigned to it. In response to receiving the attempt to perform the operation, the operation verification module determines 208 whether to allow the attempted operation.

The operation verification module determines 208 whether to allow the attempted operation by verifying the user security context assigned to the process against the object security context. For example, the operation verification module determines the corresponding user role by accessing the assignment registry to read the user security context assigned to the process. The operation verification module determines whether the user role matches any of permissible roles listed in the object security context assigned to the file system object. If the user role does not match any permissible role listed in the object security context, then it is determined that the user associated with the user role has not been granted any access permissions to the file system object and the attempted operation is denied. If the user role matches a permissible role listed in the object security context, then the operation verification module reads the access permissions granted to the matched permissible role. If the access permissions indicate that the permissible role has been granted permission to perform the attempted operation, then the operation is allowed. Otherwise, the operation is denied.

In one embodiment, if the executable program has a role assigned to it, then the process also inherits the executable role associated with the executable program, and the operation verification module can alternatively be configured to determine whether to allow the access operation also based on the executable role. An example method 300 for using security contexts to determine whether to allow an access operation based on the executable role of the executable program is illustrated in FIG. 3.

Figure 3:
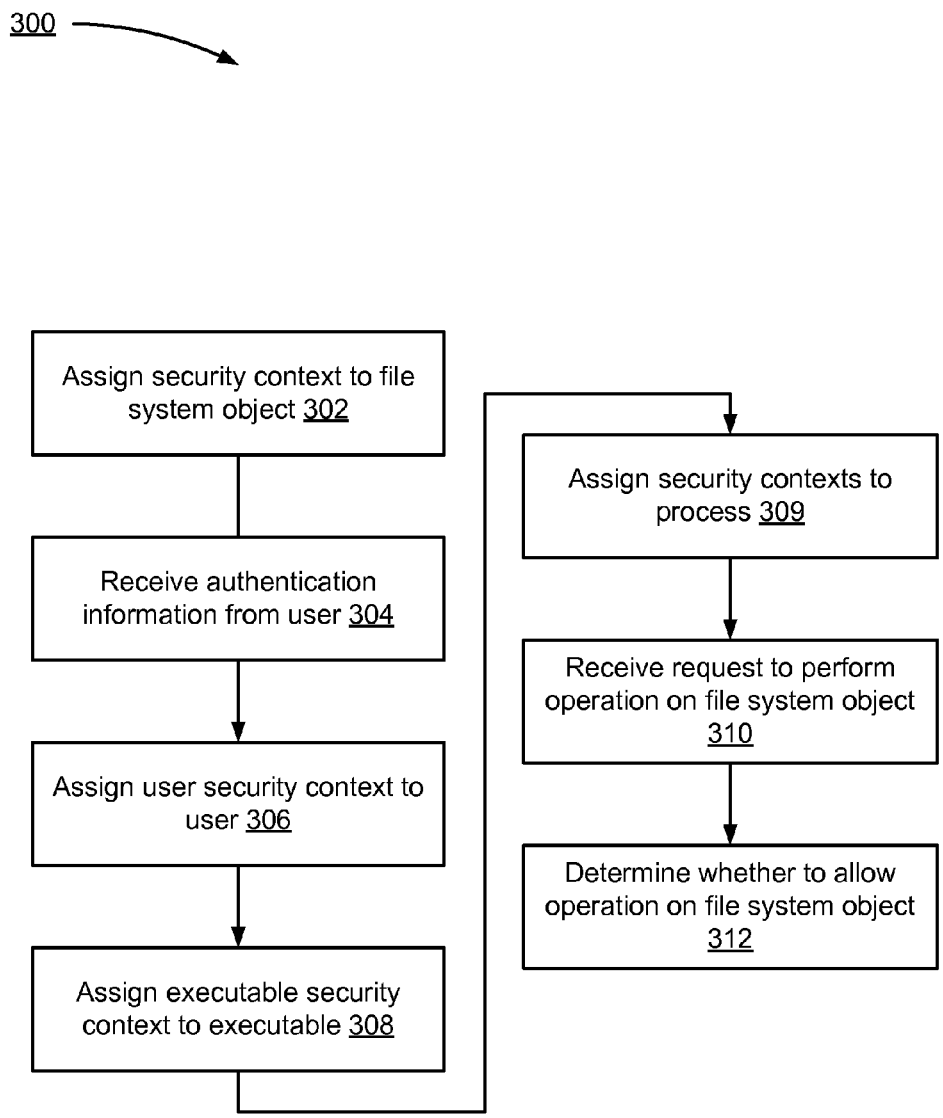
FIG. 3 is a flowchart illustrating a method for using security contexts to determine whether to allow an access operation based on a role of an executable program, according to one embodiment.

In the illustrated embodiment of FIG. 3, the security context assignment module assigns 302 an object security context to a file system object. The security context assignment module receives 304 authentication information from a user and assigns 306 a user security context to the user, establishing a user role for the user. In one embodiment, a user security context is assigned 306 each time a user logs in, and is subsequently unassigned (e.g., by deleting the corresponding registry entry) when the user logs out.

The security context assignment module also assigns 308 an executable program security context to an executable program, establishing an executable role for the executable program. In one embodiment, the security context assignment module assigns 308 an executable security context to the executable program when the user launches the executable program and deletes the assignment when the user quits the executable program. In one embodiment, the security context assignment module selects the executable program security context based on the user role associated with the user. For example, the security context assignment module can assign an executable security context with a Sales Clerk role to the executable program in response to the user having the Sales Clerk role. Likewise, the security context assignment module can assign an executable security context with a Manager role to the executable program in response to the user having the Manager role. In another example, the security context assignment module can assign an executable security context with a Management role to the executable program when the user has either a Sales Clerk role or a Manager role. The ability to assign a different executable program security context based on the user role associated with the user allows the same executable program to be used by users associated with different roles while maintaining the access permissions granted to each role.

At some point after logging in, the user launches the executable program and the program server creates a new process associated with the user and the executable program. After the new process is created, the security context assignment module assigns 309 the user security context and the executable program security context to the process (e.g., by creating new registry entries). In some embodiments, the security context assignment module assigns multiple user security contexts to the user if the user is associated with multiple user roles. In these embodiments, the new process can inherit every user role associated with the user (i.e., the security context assignment module can assign to the new process every user security context associated with the user). Alternatively, the user can temporarily relinquish one or more of the user roles that the user is associated with prior to launching the executable program. In this case, the new process is not associated with the roles that the user has relinquished (i.e., the module assigns to the new process every user security context associated with the user except the user security contexts that the user has temporarily relinquished).

Once the process begins running, the user can interact with the process to perform an operation on the file system object.

The operation verification module receives 310 a request to perform the operation on the file system object, and determines 312 whether to allow the operation by analyzing the security contexts of the process and the file system object.

In one embodiment, the operation verification module allows the attempted operation to proceed if the object security context has granted permission for the attempted operation to at least one of the user and executable roles associated with the process. The operation verification module denies the operation if the object security context does not include a set of access permissions for any of the user and executable roles associated with the process, or if the object security context includes access permissions for the one or more of the user and executable roles associated with the process but the access permissions do not grant permission for the attempted operation. For example, if a process is associated with a first role that is granted create and read permissions for the file system object and is associated with a second role that granted read and update permissions, then the operation verification module allows create, read, and update operations but denies other operations (e.g., delete).

In another embodiment, the operation verification module allows the attempted operation to proceed only if the object security context has granted permission for the attempted operation to all of the user and executable roles associated with the process. In this embodiment, the module denies the operation if any of the roles associated with the process is not granted permission for the operation, even if the same type of access permission is granted to another role associated with the process. Thus, the operation verification module would only allow the process in the previous example to perform read operations, and the operation verification module would deny create, update, and delete operations.

Since access operations are denied to processes that are not associated with an appropriate role, this method 300 can beneficially be used to limit access operations to predetermined executable programs by assigning an appropriate role only to the predetermined executable programs. For example, the security context assignment module can be configured to assign the roles of Sales Clerk and Manager exclusively to a trusted spreadsheet program that is known to not contain malicious code (e.g., MICROSOFT EXCEL). This prevents a user from using other executable programs to perform operations on spreadsheet files that have been assigned the corresponding object security context. Thus, even if a user is associated with a user role that is granted access to the spreadsheet files, the user is not able to use another executable program (e.g., a password cracking program) to perform operations on the files since the security context assignment module does not assign the appropriate executable security context to the other executable program.

It should be noted that the re-simulation of circuit behavior is described at several instances herein, for example in response to identified bottlenecks, in response to resource usage exceeding resource thresholds, in response to error measurements exceeding tolerance thresholds, or in response to any other suitable criteria. In such instances, instead of performing a complete re-simulation of circuit behavior, a simulator can re-simulate particular time steps, such as time steps associated with above-threshold resource usage, with above-threshold error measurements, with simulation bottlenecks, and the like. By re-simulating only particular time steps, resource usage and simulation time can beneficially be reduced. It should also be noted that reference is made to a "designer" herein for the purposes of simplicity only. In practice, any user can utilize the system and method described herein.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus can be specially constructed for the purposes, e.g., a specific computer, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it can prove convenient to construct more specialized apparatus to perform the method steps. The structure for a variety of these systems will appear from the description herein. In addition, the embodiments are not described with reference to any particular programming language. It will be appreciated that a variety of programming languages can be used to implement the teachings of the embodiments as described herein, and any references herein to specific languages are provided for disclosure of enablement and best mode.

In addition, the language used in the specification has been principally selected for readability and instructional purposes, and cannot have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations can be made in the arrangement, operation, and details of the methods and apparatuses of the embodiments without departing from the spirit and scope of the embodiments.

What is claimed is:

1. A method of restricting access to a file system object, comprising:
    assigning, by a security context server, an object security context to the file system object, the object security context including one or more permissible roles and defining a set of access permissions associated with each of the one or more permissible roles, the file system object stored in a file server communicatively coupled to the security context server, the security context server comprising at least one hardware processor, the file server comprising at least one non-transitory computer-readable storage medium;
    assigning, by the security context server, an executable security context to an executable program stored by a program server, the security context server communicatively coupled to the program server, the program server comprising at least one hardware processor;
    receiving, from a client device communicatively coupled to the security context server, authentication information from a user;
    assigning, by the security context server, a user security context to the user based on the received authentication information, the user security context identifying a user role for the user;
    responsive to detecting that the user has launched the executable program to create a process, assigning, by the security context server, the user security context of the user and the executable security context of the executable program to the process;
    intercepting, by the security context server, an attempt by the process to perform an access operation on the file system object;
    verifying, by the security context server, at least one of the user security context and the executable security context against the object security context to determine whether the access operation should be allowed; and
    responsive to determining that the access operation should be allowed, enabling the process to perform the access operation on the file system object.

2. The method of claim 1, wherein the executable security context identifies an executable role for the executable program.

3. The method of claim 2, wherein verifying at least one of the user security context and the executable security context against the object security context comprises:
    determining, by the security context server, whether the object security context includes at least one permissible role that matches at least one of the user role and the executable role;
    responsive to the object security context including at least one permissible role that matches at least one of the user role and the executable role, determining, by the security context server, whether the set of access permissions associated with the at least one permissible role includes a permission for the access operation; and
    responsive to the set of access permissions associated with the at least one permissible role including a permission for the access operation, determining, by the security context server, that the access operation should be allowed.

4. The method of claim 2, wherein verifying at least one of the user security context and the executable security context against the object security context comprises:
    determining, by the security context server, whether the object security context includes permissible roles that match both the user role and the executable role;
    responsive to the object security context including permissible roles that match both the user role and the executable role, determining, by the security context server, whether the set of access permissions associated with each of the permissible roles includes a permission for the access operation; and
    responsive to the set of access permissions associated with each of the object roles including a permission for the access operation, determining, by the security context server, that the access operation should be allowed.

5. The method of claim 2, wherein the executable role is different from the user role.

6. The method of claim 1, wherein assigning the executable security context to the executable program comprises selecting the executable security context based on the user role.

7. The method of claim 1, wherein the object security context further specifies different access log settings for different permissible roles.

8. A non-transitory computer-readable storage medium storing computer-executable program instructions for restricting access to a file system object, the computer program instructions configured to, when executed by a hardware processor of a security context server, cause the security context server to perform steps comprising:
    assigning an object security context to the file system object, the object security context including one or more permissible roles and defining a set of access permissions associated with each of the one or more permissible roles, the file system object stored in a file server communicatively coupled to the security context server, the file server comprising at least one non-transitory computer-readable storage medium;
    assigning an executable security context to an executable program stored by a program server, the security context server communicatively coupled to the program server, the program server comprising at least one hardware processor;

receiving, from a client device communicatively coupled to the security context server, authentication information from a user;

assigning a user security context to the user based on the received authentication information, the user security context identifying a user role for the user;

responsive to detecting that the user has launched the executable program to create a process, assigning the user security context of the user and the executable security context of the executable program to the process;

intercepting an attempt by the process to perform an access operation on the file system object;

verifying at least one of the user security context and the executable security context against the object security context to determine whether the access operation should be allowed; and responsive to determining that the access operation should be allowed, enabling the process to perform the access operation on the file system object.

9. The computer-readable storage medium of claim 8, wherein the executable security context identifies an executable role for the executable program.

10. The computer-readable storage medium of claim 9, wherein verifying at least one of the user security context and the executable security context against the object security context comprises:

determining, by the security context server, whether the object security context includes at least one permissible role that matches at least one of the user role and the executable role;

responsive to the object security context including at least one permissible role that matches at least one of the user role and the executable role, determining, by the security context server, whether the set of access permissions associated with the at least one permissible role includes a permission for the access operation; and responsive to the set of access permissions associated with the at least one permissible role including a permission for the access operation, determining, by the security context server, that the access operation should be allowed.

11. The computer-readable storage medium of claim 9, verifying at least one of the user security context and the executable security context against the object security context comprises:

determining, by the security context server, whether the object security context includes permissible roles that match both the user role and the executable role;

responsive to the object security context including permissible roles that match both the user role and the executable role, determining, by the security context server, whether the set of access permissions associated with each of the permissible roles includes a permission for the access operation; and responsive to the set of access permissions associated with each of the object roles including a permission for the access operation, determining, by the security context server, that the access operation should be allowed.

12. The computer-readable storage medium of claim 9, wherein the executable role is different from the user role.

13. The computer-readable storage medium of claim 8, wherein assigning the executable security context to the executable program comprises selecting the executable security context based on the user role.

14. The computer-readable storage medium of claim 8, wherein the object security context further specifies different access log settings for different permissible roles.

15. A security context server for restricting access to a file system object, the security context server comprising a hardware processor and a non-transitory computer-readable storage medium storing computer program instructions configured to, when executed by the hardware processor, cause the security context server to perform steps comprising:

assigning an object security context to the file system object, the object security context including one or more permissible roles and defining a set of access permissions associated with each of the one or more permissible roles, the file system object stored in a file server communicatively coupled to the security context server, the file server comprising at least one non-transitory computer-readable storage medium;

assigning an executable security context to an executable program stored by a program server, the security context server communicatively coupled to the program server, the program server comprising at least one hardware processor;

receiving, from a client device communicatively coupled to the security context server, authentication information from a user;

assigning a user security context to the user based on the received authentication information, the user security context identifying a user role for the user;

responsive to detecting that the user has launched the executable program to create a process, assigning the user security context of the user and the executable security context of the executable program to the process;

intercepting an attempt by the process to perform an access operation on the file system object;

verifying at least one of the user security context and the executable security context against the object security context to determine whether the access operation should be allowed; and responsive to determining that the access operation should be allowed, enabling the process to perform the access operation on the file system object.

16. The system of claim 15, wherein the executable security context identifies an executable role for the executable program.

17. The system of claim 16, wherein verifying at least one of the user security context and the executable security context against the object security context comprises:

determining, by the security context server, whether the object security context includes at least one permissible role that matches at least one of the user role and the executable role;

responsive to the object security context including at least one permissible role that matches at least one of the user role and the executable role, determining, by the security context server, whether the set of access permissions associated with the at least one permissible role includes a permission for the access operation; and responsive to the set of access permissions associated with the at least one permissible role including a permission for the access operation, determining, by the security context server, the access operation should be allowed.

18. The system of claim 16, wherein verifying at least one of the user security context and the executable security context against the object security context comprises:

determining, by the security context server, whether the object security context includes permissible roles that match both the user role and the executable role;

responsive to the object security context including permissible roles that match both the user role and the executable role, determining, by the security context server, whether the set of access permissions associated with each of the permissible roles includes a permission for the access operation; and responsive to the set of access permissions associated with each of the object roles including a permission for the access operation, determining, by the security context server, the access operation should be allowed.

19. The system of claim 16, wherein the executable role is different from the user role.

20. The system of claim 15, wherein assigning the executable security context to the executable program comprises selecting the executable security context based on the user role.

* * * * *